March 31, 1964 C. A. WINSLOW 3,127,255
COMBINED CENTRIFUGE AND FILTERING DEVICE
Filed Nov. 24, 1958 3 Sheets-Sheet 1

INVENTOR.
Chas. A. Winslow

March 31, 1964    C. A. WINSLOW    3,127,255
COMBINED CENTRIFUGE AND FILTERING DEVICE
Filed Nov. 24, 1958    3 Sheets-Sheet 2

INVENTOR.
Chas. A. Winslow

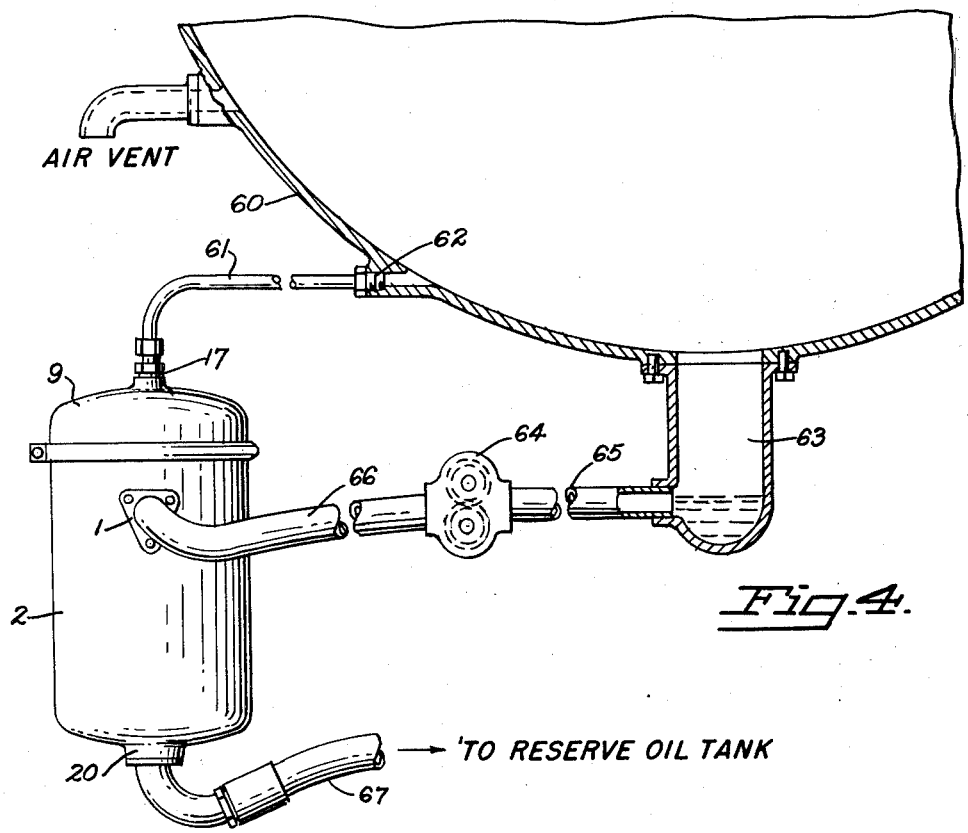
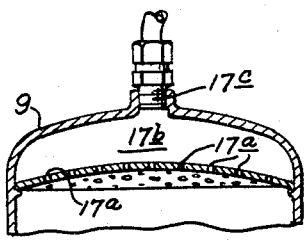

United States Patent Office 3,127,255
Patented Mar. 31, 1964

3,127,255
COMBINED CENTRIFUGE AND FILTERING DEVICE
Charles A. Winslow, Oakland, Calif., assignor, by mesne assignments, to Norman E. Fuller and Clifford M. Farmer
Filed Nov. 24, 1958, Ser. No. 776,142
10 Claims. (Cl. 55—178)

The present invention relates to improvements in an oil purifying apparatus. This application is a continuation-in-part of application Serial No. 610,763, filed September 19, 1956, and now abandoned.

My new apparatus is a combined centrifugal and filtering means of purifying fluids. Its centrifugal action is a primary stage, wherein fluids combined at the inlet in the form of foam, including gas or air and oil bubbles, are separated, the air and/or gas going in an upward direction and the liquid fluids passing in the opposite or downward direction.

This filter is particularly useful in filtering the lubricating oil for dry sump engines, such as aircraft and marine engines. Particularly in aircraft engines the sump must be kept dry, and this is done by using a sump pump that constantly pumps at a rate of about 50% higher than the rate at which the oil is normally pumped to the engine bearings by a second pressure pump. As a result, at least one third of what is pumped from the sump is air. Air is a very poor engine lubricant and if this foamy oil-air mixture is pumped to the bearings, increased wear results. Yet this is what has happened because of the difficulty in deaerating the oil-air foam. The present invention effectively solves this problem by removing most of the air content.

But this is not all that the invention does. Aircraft have been loath to carry oil filters because of the fear that they may reduce the vital circulation of the oil, because of the extra weight involved, because of the space they consume. Moreover, foamy oil does not filter well, and the oil is also full of heavy particles, of acidic corrosives, of minute pieces of metal. All these impurities have been harmful; yet there has been no efficient way of removing them from the lubrication oil of such engines. These problems are also solved by the invention.

It is particularly important to de-aerate the oil before purifying it, in order to get effective purification, and the invention does this. In fact, throughout, the invention achieves a significant order of operation, a novel sequence of purification that achieves improved efficiency in operation and improved results.

Foamy oil cannot be efficiently filtered, because the alternation of liquid and gas passing through the filter bed tends to force the collected dirt through the filter. For instance, a constant flow of oil maintained by a relatively constant pressure is filtered not only by a screening process but also by adhesion and cohesion of deleterious material to the filter fibers. This action gradually builds up the density of the filter bed and can even lead eventually to a condition where the filter bed becomes clogged with filtered-out material. Alternate slugs of oil and air, or even the disturbing influence of coarse foam in the oil stream, tends to disturb the filtering process by causing collected material to be broken loose and forced through the filter bed. It is therefore important to eliminate as much of the air and gas as possible from the oil stream before actual filtering takes place.

As the combined liquid and gasses enter a tangential inlet, they are caused to rotate during their de-aeration and to contact a metallic surface at high velocity, so as to induce and accelerate corrosive action from any materials of a corrosive nature which may be circulating with the fluids being processed. Thereby the corrosive materials are removed. Thus acids may be removed from the lubricating system of an internal combustion engine. Preferably, the heavier part of the fluid passes down over the metallic surface, which may be of magnesium or zinc, for example, and between thin walled surfaces toward the bottom of the container. The centrifugal downward flow spins heavy particles such as lead salts, grit, carbon, metal, etc., toward the periphery and the bottom of the container.

Then my new apparatus reverses the direction of flow of the oil and sends it upward through a second inner section. At the turning point it is passed through a strong magnetic field. Then the liquid goes to one or more filter elements which encase the outlet of the device. Preferably, this filter portion is so arranged that the oil must first pass a slow-rate filtering section of the filter element before reaching a final high-flow-rate section of the filter element, through either of which it passes to the central outlet of the device.

It is to be understood therefore that gas and/or air is removed from the liquid on its initial centrifugal motion, that the heavier liquid is passed between thin walls in a centrifugal motion and in a downward direction to throw out grit, heavy particles, lead salts, etc. Also, the strong magnetic field encountered by the oil before passing upward to the filtering section removes materials affected by magnetic influence at this stage before filtering and while the fluid is best subject to such removal. Then the fluids pass up over the slow-flow-rate section of the filtering device where the finest of particles can be removed, and finally the oil that does not pass through the slow-flow-rate portion passes through a rather relatively high flow rate section of the filter, so that full flow and complete circulation of fluid through the device on its passage from the inlet to the outlet is assured.

Another important feature of the device is its novel combination with a by-pass valve located in the upper section where only the cleaner portion of the fluids gravitates. This valve governs the pressure limitation between the inlet and the outlet of the apparatus, thus maintaining a constant maximum resistance that will be encountered by the combined influence of the centrifugal force, filtering, de-aeration, etc.

Still another important feature of the invention is its incorporation of a restricted vent means for the air content of the fluid, which not only lets the air go out after its centrifgual separation from the oil, but also acts to build up sufficient back pressure to insure filtration. The air can be vented back to the crankcase or to the top of the oil tank, as desired. Even if some oil passes out through the vent, no harm is done, for the foamy oil merely goes back into the crankcase or into the oil tank and foamy oil passing through the vent opening merely increases temporarily the back pressure; the air ultimately clears the vent orifice and return line.

A preferred form of the device is particularly adapted to the oiling system of an internal combustion engine where a high flow rate of lubricant is required, where large amounts of carbonaceous material are formed in the lubricant during use, and where deposits of lead salts are added to the lubricating oil as blow-by from the combustion chamber carrying the lead salts from tetraethyl gasoline used as fuel. Acids are also formed during combustion; for instance, a small amount of sulphur in the fuel has a tendency, due to its mixing with moisture formed in the crankcase, to produce sulphuric acid and consequent etching of the parts to be lubricated. Considerable amount of carbon is formed during the normal operation of the engine, all of which adds to the deterioration of the lubricating oil and the clogging of the engine parts with sludge, lead salts, metallic particles, hard carbon, etc. Experience has taught that lead salts can be centrifuged out in service as well as filtered out.

As an ample illustration of the caking and depositing of lead salts, I call attention to actual operational records indicating such serious deposits as to eventually clog hollow crank pins, oil passages, and other rotating parts where the lead is deposited due to centrifugal force on the periphery of rotating surfaces. For instance, lead salts have been thrown to the periphery of rotating propeller hubs to such an extent that in normal service the propeller mechanism has been clogged to the extent that aircraft propellers could no longer be feathered, thus causing hazardous conditions with possible serious operational failures.

In the present invention I aim to take advantage of the constantly rotating motion of the lubricating oil in the novel construction of the container to deposit the lead salts out to the periphery of the container and down into the bottom, where they are concentrated and removed from circulation, thus protecting the surfaces of the filter which are not clogged with great deposits of lead salts but are available for the removal of very fine metallic particles, grit, sand, etc., that may be in circulation. I have also provided, as previously stated, large corrosion-accelerating surfaces for the removal by chemical reaction of corrosive materials which may be in circulation with the lubricating oil, which like the filter cartridge are replaceable and expendable as they are used up in service.

Another important feature of the invention is that in addition to the centrifugal means and the controlled corrosion accelerating means, the magnetic field has been located where it removes from circulation any passing metallic particles such as ferrous alloys which are affected by a strong magnetic field. These metallic particles are thus removed from circulation with the lubricant before they reach the filter element, thereby extending the life of the filter cartridge. This feature is particularly important when the filter is used on the lubricating oil system of turbo-jet engines where considerable gear metal from worn gear reduction drives is encountered.

Another important feature of the invention is the filter cartridge itself, which is of a dual or pressure controlled construction as described in Dual Flow Filter Patent No. 2,559,267. Attention is called to the fact that in the present invention the oil first passes over the finer portion of the filter which has a tendency to absorb all of the finer materials due to a very low flow rate through this first initial portion of the filter element, and the fluid that passes up and over the face of the lower part of the element flows through a higher flow filtering section. This action insures a continuous flow of oil throughout the whole filter unit during normal operation and thus provides for continual circulation of the oil in the filter rather than endeavoring to stop all the fine particles with a filter construction whose porosity, if too fine or the flow rate too slow, would soon clog up and would not provide a rapid flow of lubricant through the device. This rapid flow is necessary in aiding the centrifugal motion and cleaning in the primary stage and the separation of the air from the oil in its upper portion and also the intimate contact of fluids on acid-neutralizing surfaces with the continual high flow rate of lubricant passing from the inlet to the outlet of the apparatus.

Referring now to the drawings:

FIG. 4 is a fragmentary view in elevation, partly diagrammatic and partly in section, of a portion of a lubricating system embodying the apparatus of FIGS. 1–3 with a dry sump engine.

FIG. 5 is a fragmentary view in elevation and in section showing a modified form of venting.

Figure 1:
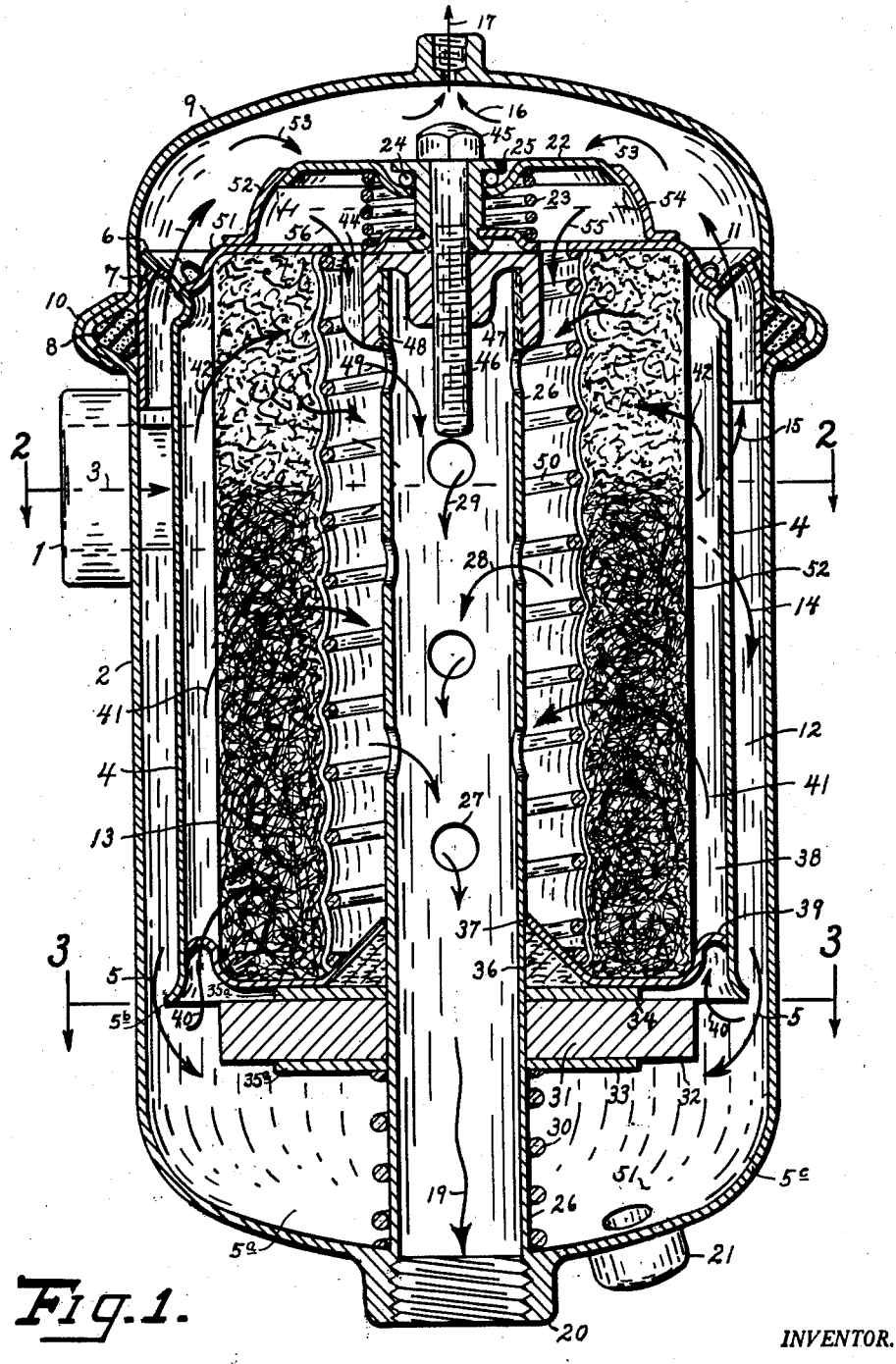
FIG. 1 is a sectional view taken through the center of an apparatus embodying the principles of the invention and illustrates the various parts in their respective positions which is further illustrated by reference to the line A—A of FIG. 2 and the line B—B of FIG. 3, indicating the relative radial positions of the parts shown in FIG. 1.
Figure 2:
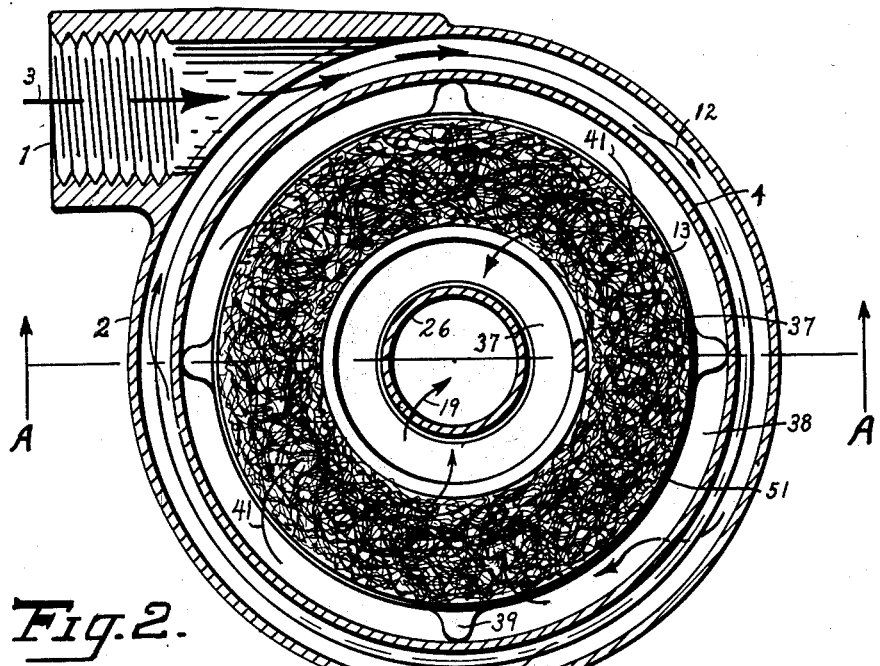
FIG. 2 is a horizontal sectional view taken on the line 2—2 of FIG. 1.

Referring to FIG. 1, the numeral 1 indicates the inlet of the combined filter and centrifuge which is attached in a tangential manner to the casing 2, as more clearly shown in FIG. 2. The direction of the oil and air or gas as it enters the casing is indicated by the arrow 3. An inner cylindrical tube or casing 4 is provided, which comprises a cylindrical thin walled passage with a circular opening on the bottom between the outer shell 2 and the casing 4, the flow of oil therefrom being indicated by the arrows 5. This casing 4 is adapted to perform several novel functions: (a) it acts as a baffle to intensify the action of centrifugal force on the oil thereby helping to throw the heavy solids toward the casing 2; (b) it acts as a baffle to cause the oil to flow down to the sump 5a and deposit the solids there; (c) it acts as a baffle to prevent the oil from having direct access to the filter 13 from above; (d) its lower edge, preferably out-turned at 5b, forces the oil to turn around and changes the general direction of flow from downwardly to upwardly; (e) it, itself, preferably being made of easily corridible metal such as magnesium or zinc, acts to combine with acids to form salts that drop out in the sump 5a, instead of sending acids through the filter and back to the engine; (f) it guides the oil into a magnetic field; (g) it guides the upwardly flowing oil to the filter and assures first access to the slow-flow-rate portion; and (h) its upper end limits flow of oil upwardly and permits passage of air and gas and of by-passed oil.

A flanged top 6 on the casing 4 is provided, which rests on the ring 7, which is preferably spot-welded to the outer shell on the casing 2, forming a rigid part with the bottom part of the casing and serving to hold the O-ring seal 8 in place and also to pilot and guide the cover 9, which is normally held in place by Marmon clamp 10 in a conventional manner. Ports 11 are provided for the escapement of air and/or gasses in an upward direction and also to permit fluid to pass from the space 12 when a predetermined resistance is caused by either the centrifugal motion of the oil or the resistance of the filter element referred to generally by the reference character 13, or both.

In operation, lubricating oil or other fluids to be purified normally spin around and down as indicated by the arrow 14, and air bubbles and/or fluid passing to the by-pass outlet pass upward as indicated by the arrow 15. As air or bubbles pass through the ports 11 to the space 16 toward the outlet 17, it is to be understood that the volume of air in relation to the volume of lubricating oil is normally substantially less and that herein it is kept under back-pressure; so it can be vented and removed through a much smaller opening as indicated by the arrows 16 and 17, as compared to the outlet 19 for clean fluid in the center lowermost portion of the invention.

Moreover, the air outlet 17 is kept small so as to build up the back pressure needed for filtration of the liquid. The exact size of the air outlet depends on a number of factors, including the pressure used, the amount of the oil circulated, and so on. In one filter where a dry-sump pump drew in 2/3 oil and 1/3 air, the air outlet 17 was provided by a plurality of small (1/32″) openings totaling in area the same as a single 1/4″ opening. A plurality of small vent openings is better than a single larger one in effectiveness because it gives more restriction, provides more outlets so that temporary plugging of some makes little difference, and is less likely to leak oil unduly. An example of this structure appears in FIG. 5, where a plurality of small vent openings 17a leads into an upper chamber 17b above the space 16, whence the air leaves by an outlet opening 17c and conduit 61.

A suitable outlet fitting 20 in service is connected to the lubricating system where clean oil is returned for reuse. A drain fitting 21 is normally provided for the removal of sludge, grit, etc., or in some types of service for continual removal of heavier fluids which may be separated from lighter fluids. A by-pass valve 22 is normally held closed by a spring 23 which seals the valve 22 on its seat and against a soft O-ring 24 on the valve guide stem 25. A perforated outlet center tube 26 is provided and normally rigidly attached to the bottom outlet fitting 20 and outer shell on casing 2. A plurality of oil outlet holes 27 are provided for oil flow as indicated by the arrows 28 and 29, etc.

Figure 3:
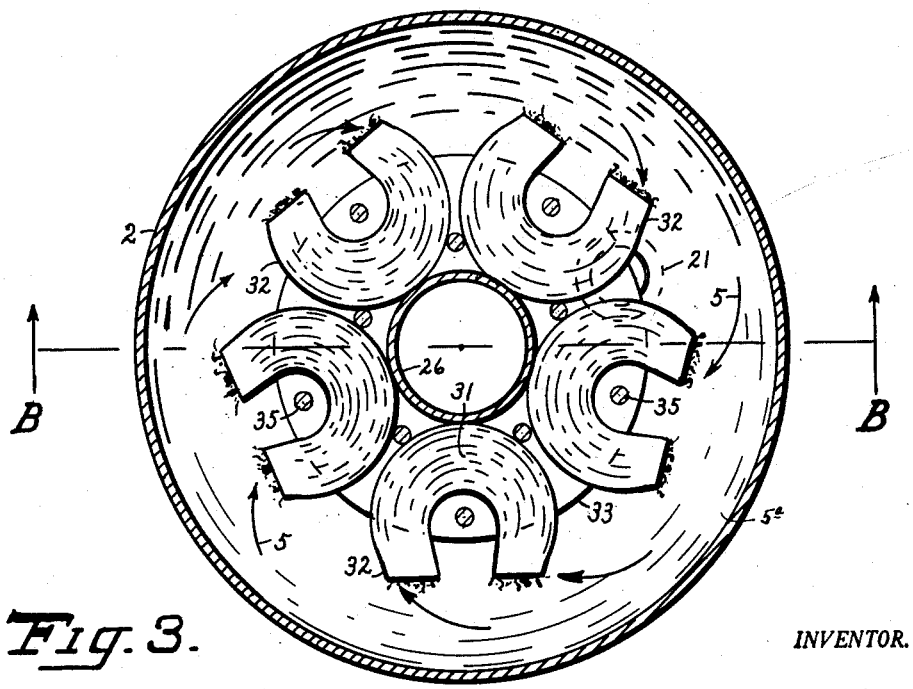
FIG. 3 is a horizontal view taken on the line 3—3 of FIG. 1, both views looking in the direction indicated by the arrows.

A spring 30 normally rests on the bottom of the filter casing 2 and presses upwardly against a magnet assembly 31. The magnet assembly comprises a plurality of small strong magnets 32, as more clearly illustrated in FIG. 3. The magnets are normally clamped between two brass or non-magnetic plates 35a and held together by a plurality of rivets 35. The entire assembly is slidable on the center outlet tube 26. A suitable sealing washer 36 of cork or other suitable material is compressed between the upper plate 34 and the element support washer and spacer 37. This assembly of parts 34, 36, and 37, incidentally, provides a slidable filter element sealing means on the tube 26 and also a spacing means by extensions 39 to centralize the filter element 13 generally away from the circular inner shell 4, thus providing a circular space between the tube or shell 4 and the outer casing 2 and also providing an inner space of circular form 38 serving as an upward oil flow space, as indicated by the arrows 40, 41, 42, etc.

The filter element 13 resting on the spacer and sealing plate 37 is supported by the spring 30 and drawn down in place by a capscrew 45 which has a long threaded extension 46 threaded through the cap member 47, which is threaded onto the central tube 26, as indicated at 48. The cap member 47 is provided with a plurality of extensions or wings 44, which serve to centralize the filter element 13 by engaging the inner spring coil 50 which supports the filtering element. The several parts; compression cap 51, valve seat 52, valve 22, spring 23, seal 24, and guide 25; form an assembly and in service comprise and are handled as a single unit. When compression cap 51 is drawn down by the capscrew 45 it compresses the filter element 13 in place against the pressure of the spring 30 and sealing means 36. It also holds the magnet assembly in place and at the same time compresses the circular perforated flange 6 on top of the tube 4 against the ring 7, which is welded to the shell 2, thus completing a rigid assembly which can be inspected before the cover 9 is placed down on the O-ring gasket 8 and drawn in place tightly by the Marmon clamp 10.

During operation when at such time as the lower sump 51 and the exterior of the filter element 52 are clogged with sludge, thus building up a back pressure equal to the pressure of the spring 23 against the valve 22, then the pressure of the oil on the face of the valve 22, as indicated by the arrows 53, causes the valve 22 to open down to a position indicated by the line 54. Thus, with the valve 22 open, oil passes around its face and through a plurality of ports 55, 56, etc., down into the clean oil side of the filter element 49 where it can pass on out through the outlet 19. Thus a complete by-pass is provided in the event that the filter should become clogged with sludge, lead salts, etc., to such an extent that oil flow through the device is impaired. Thus, by-passed oil is provided rather than no oil as a safety feature and at the same time all of the collected sludge that has been removed from the oiling system is trapped out of circulation. By-passed oil is provided only when the filter is full of dirt, or at least clogged to such an extent that normal oil flow through it is restricted or impaired equal to the pressure exerted by the by-pass spring 23 on the valve 22 in the upper, cleanest section of the fluid filtering device.

It is to be understood, therefore, that fluid and preferably lubricating oil passing from the inlet 1 to the outlet 19 of the device is centrifuged and deaerated with the air vented and passing out the restricted air outlet 17 at the top, where pressure is built up, and the fluid to be purified passing on down through the centrifugal passage between the case 2 and the outer perimeter of the shell 4. Then, as the spinning oil is reversed to flow up through the filter element 13, it passes over the faces of the magnets 32 and therefore through a strong magnetic field. The fluid is next filtered through either a slow flow rate portion in the lower section of the filter element to which the fluid has first access, or through a higher flow rate section in the upper portion of the filter element which insures a complete flow and circulation of fluid through the device.

This unique combination provides a novel coaction between centrifuging, acid elimination by promoting the acceleration of corrosion on a preferred expendable surface, magnetic elimination of ferrous materials, and finally filtering through either of two parallel stages before the fluid is passed out through the central outlet of the combined filter and purifier.

The novel co-action and cooperation of the elements should be emphasized. With the unitary casing 2 all the above operations are carried out in a carefully planned sequence. Filtering is not done until the oil has been centrifuged free from air and from the heavy solids and has been subjected to corrodible metal to free it from acids, and the heavy salts and other particles are removed by the centrifuge and deposited in the sump 5a. The importance of de-aeration before filtration and as a first step is very significant. It not only increases the efficiency of the purification process but, in fact, makes good filtration possible; it also reduces the volume of fluid to be processed and the de-aerated oil (containing only a small amount of air) is freer from surface tension effects present in the foam and so able to let the solids settle in the bottom and gummy, resinous, and othe deleterious materials adhere to the filtering fibers. Were the de-aeration to be accomplished later, much less satisfactory results could be obtained. Centrifuging—accomplished by the tangential opening 1 in combination with the cylindrical casing 2 and the cylindrical shell 4—also keeps the passage to the filter 13 open, due to its concentrating the plugging salts, etc., in the sump 5a and the shape of the lower part 5c of the casing aids in this deposition in the sump 5a.

Similarly, the ferromagnetic particles are removed by magnetic action before they reach the filter 13; so the life of the filter 13 is greatly prolonged by the collection of a very substantial portion of filter-plugging materials in the sump 5a and by the magnet 31. The location of the magnet assembly 31 where the fluid flow changes direction assures maximum exposure of the fluid to the magnetic field at the very time when the ferromagnetic particles can most easily be removed, due to their lower velocity during the turn and to their being impelled toward the magnets 32 by centrifugal force at the turn. The filter 13 provides adequate back pressure to aid in accomplishing the needed flow and de-aeration while still providing full flow. Finally, the by-pass valve 22 operates by virtue of cooperation between the filter pressure, the clogging of the sump 5a (if there is clogging), and the pressure of the spring 23, and if any oil is by-passed it will be that at the top, which is the cleanest unfiltered portion and the part least likely to be clogged by the centrifuged-out solids.

The foregoing description and drawings clearly describe my invention but I do not wish to limit myself to the exact form used or the details illustrated for the obvious reason that various changes in dimensions and construction details may be resorted to without departing from the spirit and scope of the invention. Furthermore, I have described the invention in its preferred form, as a lubricant purifier preferably adaptable to the lubricating system of internal combustion engines, with particular reference to aircraft engines of various types, where deleterious material is encountered in high flow rate lubricating oil which must be de-aerated as well as purified for successful continuous operation of the engine.

As an alternate use I anticipate that it can be used for fuel and other purposes; for instance, for separating water from fuel I would close or restrict the by-pass and the circular space 5 and substitute a sintered metal or glass cloth circular member in place of the inner shell 4 and thus coalesce the moisture in a first stage and force it into the bottom in large droplets that would not pass through the exterior face of a fuel filter element substituting in place of the element referred to by the reference character 13. In other words, the device has many uses with various modifications.

As stated earlier, the apparatus of this invention is particularly useful with a dry-sump engine. FIG. 4 illustrates such an installation. Here the casing 2 is installed in the lubricating system of a dry-sump engine having a crankcases 60. The vent 17 of the housing 2 is preferably connected by air conduit 61 to a fitting 62 in the crankcase 60 above the sump 63. Any oil foam in the air line dribbles down into the sump. A sump pump 64 is connected to the sump 63 by a conduit 65 and keeps it sucked dry by having a capacity substantially larger than the lubricating pump (not shown) for the engine. The result is that much air is drawn in and foamy oil is delivered by conduit 66 to the inlet 1 for treatment as explained. The purified and de-areated oil is led from the outlet to the reserve oil tank (not shown) by a conduit 67.

It may be noted that the sump pump 64 may be inside the engine, if desired. Its location does not matter so long as its conduit 65 is at the bottom of the sump 63 to keep it dry.

Having thus described my invention, what I claim is:

1. An oil purifying apparatus for separating air and gas bubbles, heavy solids, magnetic solids, and other materials from oil while maintaining a flow of oil therethrough at substantially constant pressure, including in combination: a generally cylindrical closed housing with a generally vertical axis, a sump at its lower end, a tangential inlet near its upper end, and a hollow cap portion at its upper end having a restricted, pressure-producing air and gas outlet theerthrough; an axially extending clean-oil outlet tube leading from near the upper end of said housing down through a central bottom outlet through the lower end of said housing; a generally cylindrical filter cartridge surrounding said outlet tube and communicating with said outlet tube, for the radially inward passage of filtered oil from said cartridge into said tube, said cartridge having a lower low-flow-rate portion and an upper high-flow-rate portion; means for spacing said filter cartridge radially inwardly from said housing and axially above said sump and below the upper end of said housing; an axial cylindrical shell between and spaced from both said cartridge and said housing between said sump and said cap portion and having an upper portion above said inlet providing for restricted passage of fluids up into said hollow cap, whereby most of the oil entering said housing through said inet flows downwardly between said housing and said shell and then upwardly inside said shell into said filter cartridge; magnetic means supported beneath said cartridge and above said sump for catching ferro-magnetic particles from said oil as the oil flows around the lower end of said shell and up into said shell; and by-pass means for passing oil from the inside of said cap portion into said outlet tube when an excessive oil pressure is reached inside said housing.

2. An oil purifying apparatus for separating air and gas bubbles, heavy solids, magnetic solids, and other materials from oil while maintaining a flow of oil therethrough at substantially constant pressure, including in combination: a generally cylindrical housing with a generally vertical axis, a sump at its lower end with a normally closed outlet through which heavy solids can be withdrawn at intervals, and a tangential inlet near an open upper end; a hollow cap closing said housing upper end and having an air and gas outlet through its own upper end, through which pass the air and gas that float to the top; an axially extending clean-oil outlet tube leading from near the upper end of said housing down through a central bottom outlet through the lower end of said housing; a generally cylindrical filter cartridge surrounding said outlet tube, said outlet tube being perforated for the radially inward passage of oil from the outer periphery of said cartridge into said tube, said cartridge having a lower low-flow-rate portion for the absorption of fine solid particles and an upper high-flow-rate portion for less thorough filtering of the oil and for more rapid passage thereof when the oil is relatively cold; means for spacing said cartridge radially inwardly from said housing, axially above said sump, and below the upper end of said hollow cap; a cylindrical shell of metal readily reactible with acids and other corrodible material, between and spaced from both said cartridge and said housing and having an outwardly flared lower edge extending a short distance below the lower end of said cartridge and an upper outwardly extending portion above said inlet providing for limited passage of fluids up into said hollow cap, whereby most of the oil entering said housing through said inlet is whirled against said shell and flows downwardly into an upper portion of said sump, where centrifugal action and gravity deposit the heavy solids, and then upwardly around and into said filter cartridge, while the air and gas work their way upwardly through a smaller amount of oil passing up into said hollow cap, and the air and gas pass out said cap outlet; a plurality of permanent magnets supported beneath said cartridge above the bottom of the sump for catching magnetic particles from said oil as the oil turns the corner when it flows down around said shell and passes up inside said shell; and by-pass means for passing oil from the inside of said cap into said outlet tube when an excessive oil pressure is reached inside said housing.

3. An oil purifying system for separating oil from impurities including in combination: an engine having a crankcase with a sump; a sump pump having an inlet conduit connected to said sump and an outlet conduit, and keeping said sump dry by sucking in oil therefrom, with air; a generally vertical cylindrical housing having a sump at its lower end and a tangential inlet near an open upper end connected to said outlet conduit of said sump pump; a hollow cap closing said housing upper end and having an air and gas outlet through its own upper end, through which pass the air and gas that float to the top, said outlet having a restricted orifice to keep pressure inside said housing; an air and gas conduit connecting said air and gas outlet to said crankcase; an axially extending clean-oil outlet tube leading from near the upper end of said housing down through a central bottom outlet through the lower end of said housing; a generally cylindrical filter cartridge surrounding said outlet tube, said outlet tube being perforated at intervals between the upper and lower ends of said cartridge for the radially inward passage of oil from said cartridge into said tube; means spacing said cartridge radially inwardly from said housing, axially above the said sump of said housing, and below the upper end of said hollow cap; and a metal cylindrical shell between and spaced from both said cartridge and said housing, whereby most of the oil entering said housing through said inlet is whirled against said shell and flows downwardly into an upper portion of said sump of said housing and then upwardly into contact with said filter, while the air and gas works its way upwardly through a smaller amount of oil passing into said hollow cap and the air and gas passes out said restricted orifice to said crankcase.

4. An oil-purifying apparatus including in combination: a generally vertical cylindrical housing with a sump at its lower end and a tangential inlet below its upper end; a generally cylindrical annular filter cartridge with an outer periphery, a lower end, and axial outlet means leading out from said cartridge and said housing; means for spacing said cartridge radially inwardly from said housing and its lower end axially above said sump; an axial cylindrical shell between and spaced away from both said cartridge and said housing and extending axially down to said sump; and magnetic means positioned below said cartridge adjacent the lower end of said shell for attracting and holding ferromagnetic material at the point where said oil changes direction, whereby most of the oil entering said housing through said inlet is whirled around said shell and downwardly into said sump and then flows past said magnetic means as it turns upwardly inside said shell and flows around and into said filter cartridge.

5. An oil-purifying apparatus including in combination: a generally vertical cylindrical housing with a sump at its low end and a tangential inlet below its upper end; a generally cylindrical annular filter cartridge with an outer periphery, a lower end, and an axial outlet means leading out from said cartridge and said housing; means for spacing said cartridge radially inwardly from said housing with its lower end axially above said sump; and an axial cylindrical shell between and spaced away from both said cartridge and said housing and extending axially down to said sump, said shell being made of metal easily attacked by acids, for the removal from said oil of acids by chemical reaction with said shell; whereby most of the oil entering said housing through said inlet is whirled around said shell for reaction of its acids therewith and downwardly into said sump and then upwardly inside said shell for further reaction therewith and around and into said filter cartridge.

6. An oil-purifying apparatus including in combination: a generally vertical cylindrical housing with a sump at its lower end and a tangential inlet below its upper end; a generally cylindrical annular filter cartridge with an outer periphery, a lower end, and an axial outlet means leading out from said cartridge and said housing; means for spacing said cartridge radially inwardly from said housing with its lower end axially above said sump; and an axial cylindrical shell between and spaced away from both said cartridge and said housing and extending axially down to said sump; and by-pass means for passing oil upwardly from near said inlet between said shell and said housing and thence into said outlet means when a predetermined internal fluid pressure is reached, whereby most of the oil entering said housing through said inlet is whirled around said shell and downwardly into said sump and then upwardly inside said shell and around and into said filter cartridge, thus when a definite filtering resistance is reached, the cleanest oil only above said inlet is by-passed, this being oil from which contained impurities were centrifuged or settled out down into said sump.

7. An oil purifying device for use with an engine having a crankcase with a sump and a sump pump having an inlet conduit connected to said sump and an outlet conduit, said sump pump keeping said sump dry by sucking in oil therefrom with air obtained from the interior of said crankcase, said device including in combination, a generally cylindrical casing with a lower end and an upper end having a removable cover, a tangential inlet adapted to be connected to the outlet conduit from said sump pump, a central outlet for purified oil, passing through said lower end for supplying purified oil to said crankcase, and a restricted outlet for aid in said cover, adapted to be connected to said crankcase for conducting air thereto, means in said casing and spaced radially inwardly therefrom for providing an annular chamber therein and cooperating with said tangential inlet for centrifugally deaerating a foamy air-oil mixture coming from said sump pump, for sending air to said restricted outlet and for separating the heavier particles from the lighter particles of said oil as a first stage of purification, magnetic means in said casing for separating out ferrous materials from the centrifuged oil as a second stage of purification, and filter medium in said casing providing a third stage of purification, said filter medium having a fine low-flow rate portion and a high-flow rate portion in parallel, said stages of purification of said air-oil mixture being accomplished successively and continuously while passing said oil from said tangential inlet to said central outlet and while returning air to the crankcase to have it available for said sump pump, said restricted outlet for air from said casing maintaining the filter pressure necessary to send said oil through said filter medium.

8. An oil purifier for use in connection with an engine having a crankcase with a sump, a sump pump having an inlet conduit connected to the sump and an outlet conduit, said pump keeping said sump dry by sucking in oil therefrom along with air obtained from said crankcase, said purifier comprising, a casing with a tangential inlet, a central outlet for fluids on the lower portion thereof, and a restricted gas outlet on the upper portion thereof, said central outlet being connected to return oil to said crankcase while said gas outlet returns air to said crankcase separately, and said inlet being connected to the outlet from said sump pump, means providing an unobstructed circular passage on the inner periphery of the casing in communication with said gas outlet and serving as a centrifugal means for deaeration and for separating heavier from lighter particles of said oil, a filter element in said casing, and means providing a second circular passage encompassing the face of said filter element for further purification of the oil after deaeration and after passing the centrifugal stage of the oil purifier.

9. An oil purifying apparatus for deaerating foamy oil coming from a sump pump of an engine having a crankcase with a sump, said pump keeping said sump dry by sucking in oil therefrom along with air from said crankcase, said apparatus serving to deaerate the foamy oil issuing from said sump pump and to separate the oil from impurities and including in combination, a generally vertical cylindrical housing having a sump at its lower end and a tangential inlet near an open upper end, said tangential inlet being connected to the outlet conduit from said sump pump, a hollow cap closing said housing upper end and having a restricted air and gas vent means through its own upper end connected to said crankcase, through which the air and gas that float to the top pass back to said crankcase to supply air for said sump pump, the restriction of said vent means maintaining back pressure in said housing, an axially extending clean oil outlet tube leading from near the upper end of said housing continuously down through a central bottom outlet to the lower end of said housing and connected thereby back to said engine, a generally cylindrical filter cartridge surrounding said outlet tube, said outlet tube being perforated for the radially inward passage of oil from said cartridge into said tube, means spacing said filter cartridge radially inwardly from said housing and axially above said housing sump and below the upper end of said hollow cap, and a metal cylindrical shell between and spaced from both said cartridge and said housing, whereby most of the oil entering said housing from said sump pump through said inlet is whirled against said shell and flows downwardly into an uppper portion of the sump of said housing and then flows upwardly into contact with said filter, while the air and gas work their way upwardly through a smaller amount of oil, passing into said hollow cap, the air and gas passing out through said vent means and back to said crankcase.

10. The apparatus of claim 9 wherein said shell is made from easily corrodible metal for reaction with corrosive agents in said oil and the removal of them, said oil being impinged against said shell for intimate contact therewith.

References Cited in the file of this patent

UNITED STATES PATENTS

| | | |
|---|---|---|
| 1,683,780 | Hulsmeyer | Sept. 11, 1928 |
| 1,752,050 | Young | Mar. 25, 1930 |
| 1,822,021 | Fuqua | Sept. 8, 1931 |
| 2,010,435 | Matheson | Aug. 6, 1935 |
| 2,170,074 | Hewitt | Aug. 22, 1939 |
| 2,337,470 | Hill | Dec. 21, 1943 |
| 2,392,901 | Brown | Jan. 15, 1946 |
| 2,464,870 | Kamrath | Mar. 22, 1949 |
| 2,559,267 | Winslow | July 3, 1951 |
| 2,635,754 | Stem | Apr. 21, 1953 |
| 2,638,228 | Downey | May 12, 1953 |
| 2,750,042 | Wilkinson | June 12, 1956 |
| 2,811,220 | Winslow | Oct. 29, 1957 |
| 2,983,384 | Winslow | May 9, 1961 |

FOREIGN PATENTS

| | | |
|---|---|---|
| 994,120 | France | Aug. 3, 1951 |

UNITED STATES PATENT OFFICE

CERTIFICATE OF CORRECTION

Patent No. 3,127,255 March 31, 1964

Charles A. Winslow

It is hereby certified that error appears in the above numbered patent requiring correction and that the said Letters Patent should read as corrected below.

Column 6, line 25, for "With" read -- Within --; line 39, for "othe" read -- other --; column 7, line 22, for "crankaces" read -- crankcase --; line 31, for "de-areated" read -- de-aerated --; line 47, for "theerthrough" read -- therethrough --; column 9, line 22, for "low" read -- lower --; line 73, for "aid" read -- air --; column 11, line 7, for "upper" read -- upper --.

Signed and sealed this 15th day of September 1964.

(SEAL)
Attest:

ERNEST W. SWIDER
Attesting Officer

EDWARD J. BRENNER
Commissioner of Patents